(12) United States Patent
Choi et al.

(10) Patent No.: US 10,375,312 B2
(45) Date of Patent: Aug. 6, 2019

(54) IMAGING DEVICE AND VIDEO GENERATION METHOD BY IMAGING DEVICE

(71) Applicant: Samsung Electronics Co., Ltd., Suwon-si, Gyeonggi-do (KR)

(72) Inventors: Jun-kwon Choi, Suwon-si (KR); Sung-hoon Kim, Suwon-si (KR); Su-jin Ryu, Suwon-si (KR); Dong-jin Jung, Seoul (KR); Kyu-chun Han, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 161 days.

(21) Appl. No.: 15/313,548

(22) PCT Filed: Jun. 3, 2015

(86) PCT No.: PCT/KR2015/005565
§ 371 (c)(1),
(2) Date: Nov. 22, 2016

(87) PCT Pub. No.: WO2015/186964
PCT Pub. Date: Dec. 10, 2015

(65) Prior Publication Data
US 2017/0201686 A1     Jul. 13, 2017

(30) Foreign Application Priority Data
Jun. 3, 2014  (KR) .................. 10-2014-0067293

(51) Int. Cl.
*H04N 5/232*     (2006.01)
*G06F 3/041*     (2006.01)
(Continued)

(52) U.S. Cl.
CPC ......... *H04N 5/23293* (2013.01); *G06F 3/041* (2013.01); *G06T 7/20* (2013.01);
(Continued)

(58) Field of Classification Search
None
See application file for complete search history.

(56) References Cited

U.S. PATENT DOCUMENTS 7,986,808 B2   7/2011   Ikeda
8,549,571 B2  10/2013   Loher et al.
(Continued)

FOREIGN PATENT DOCUMENTS

CN      1756309     4/2006
CN    102843513    12/2012
(Continued)

OTHER PUBLICATIONS

Partial Supplementary European Search Report dated Nov. 9, 2017 for counterpart EP Application No. 15803556.8.
(Continued)

*Primary Examiner* — Eileen M Adams
(74) *Attorney, Agent, or Firm* — Nixon & Vanderhye, P.C.

(57) ABSTRACT

Provided are an imaging device and a video generation method by the imaging device, and more specifically, an imaging device, which enlarges an object selected in a video displayed on a screen and displays same, and a video generation method by the imaging device. According to an example embodiment, an object selected in a video displayed on a screen is enlarged, and the enlarged object is tracked and then displayed on the screen.

14 Claims, 14 Drawing Sheets

(51) Int. Cl.
*H04N 5/225* (2006.01)
*G06T 7/20* (2017.01)
*H04N 5/262* (2006.01)
*H04N 5/45* (2011.01)

(52) U.S. Cl.
CPC ............ *H04N 5/225* (2013.01); *H04N 5/232* (2013.01); *H04N 5/23216* (2013.01); *H04N 5/2628* (2013.01); *H04N 5/45* (2013.01)

(56) References Cited

U.S. PATENT DOCUMENTS

| | | |
|---|---|---|
| 8,594,488 B1 | 11/2013 | Grundmann et al. |
| 9,071,749 B2 | 6/2015 | Hwang et al. |
| 2008/0074550 A1 | 3/2008 | Park |
| 2008/0079754 A1 | 4/2008 | Kuroki |
| 2010/0318929 A1* | 12/2010 | Hilton .................. G06F 3/0486 715/769 |
| 2010/0321536 A1 | 12/2010 | Lee et al. |
| 2011/0249073 A1* | 10/2011 | Cranfill .................. H04N 7/147 348/14.02 |
| 2011/0316884 A1* | 12/2011 | Giambalvo ....... G06F 17/30058 345/660 |
| 2013/0150093 A1 | 6/2013 | Seol et al. |
| 2013/0208135 A1 | 8/2013 | Han et al. |
| 2013/0208168 A1 | 8/2013 | Kim et al. |
| 2013/0265467 A1 | 10/2013 | Matsuzawa et al. |
| 2014/0047340 A1 | 2/2014 | Ravi et al. |
| 2014/0244858 A1* | 8/2014 | Okazaki ................ H04L 65/605 709/231 |
| 2014/0334797 A1* | 11/2014 | Lee ........................ G11B 27/28 386/241 |
| 2015/0085184 A1* | 3/2015 | Vidal .................... H04N 5/2252 348/376 |

FOREIGN PATENT DOCUMENTS

| | | |
|---|---|---|
| EP | 2 538 660 | 12/2012 |
| EP | 1 643 758 | 6/2013 |
| JP | 2005-354333 | 12/2005 |
| JP | 2011-239104 | 11/2011 |
| KR | 10-2010-0035385 | 4/2010 |
| KR | 10-2010-0093955 | 8/2010 |
| KR | 10-2013-0092213 | 8/2013 |
| KR | 10-2013-0092360 | 8/2013 |
| KR | 10-2013-0092723 | 8/2013 |
| KR | 10-2014-0020577 | 2/2014 |
| WO | 2013/132828 | 9/2013 |

OTHER PUBLICATIONS

Search Report and Written Opinion dated Aug. 17, 2015 in counterpart International Patent Application No. PCT/KR2015/005565.
Extended European Search Report dated Feb. 6, 2018 in counterpart EP Application No. 15803556.8.
Office Action dated Oct. 8, 2018 in counterpart Chinese Patent Application No. 201580029542.4 and English-language machine translation.
Second Office Action dated Mar. 19, 2019 in counterpart Chinese Patent Application No. 201580029542.4 and English-language machine translation.
Examination Report dated May 29, 2019 in counterpart Indian Patent Application No. 201617038959.

* cited by examiner

IMAGING DEVICE AND VIDEO GENERATION METHOD BY IMAGING DEVICE

CROSS-REFERENCE TO RELATED APPLICATIONS

This application is the U.S. national phase of International Application No. PCT/KR2015/005565 filed 3 Jun. 2015, which designated the U.S. and claims priority to KR Patent Application No. 10-2014-0067293 filed 3 Jun. 2014, the entire contents of each of which are hereby incorporated by reference.

TECHNICAL FIELD

The following example embodiments relate to an imaging device and a video generation method by the imaging device, and more particularly, to an imaging device, which enlarges an object selected in a video screen and tracks the enlarged object, and a video generation method by the imaging device.

BACKGROUND ART

A user images various still images or videos using an imaging device. The user may image a desired video by adjusting an angle of view and an angle, etc. using a lens.

When performing video imaging of a race of a speeding motorcar along a track, the user wants to image a dynamic video centering on his/her own cheering car racer's motorcar. In this case, when the imaging device and the angle of view of the lens are not sufficient, it is not easy for the user to image a desired video.

DETAILED DESCRIPTION OF THE INVENTION

Technical Solution

One aspect of the present invention provides a video generation method by an imaging device, the video generation method including: claim 1.

In an example embodiment, resolution of the enlarged first area may be lower than resolution of the video.

Another aspect of the present invention provides an imaging device including: claim 15.

Advantageous Effects of the Invention

An imaging device that enlarges an object selected by a user input in a video displayed on a screen and displays the enlarged object, and a video generation method by the imaging device can be provided.

An imaging device that enlarges an object selected by a user input in a video displayed on a screen, displays the enlarged object and tracks the enlarged object continuously, and a video generation method by the imaging device can be provided.

An imaging device that enlarges an object area including an object selected in a video displayed on a screen and displays the enlarged object area, wherein resolution of the enlarged object area is lower than that of a video, and a video generation method by the imaging device can be provided.

An imaging device that enlarges an object area including an object selected in a video displayed on a screen and displays the enlarged object area, wherein au auto focusing function and an auto exposure function are applied to the enlarged object area, and a video generation method by the imaging device can be provided.

An imaging device that enlarges an object area including an object selected in a video displayed on a screen and displays the enlarged object area, wherein at least one of visual feedback and auditory feedback corresponding to enlargement and displaying of the object area is provided to a user, and a video generation method by the imaging device can be provided.

Example embodiments of the present invention are not limited thereto, and according to various example embodiments of the present invention, an imaging device that enlarges an object selected by a user input in a video displayed on a screen and displays and tracks the enlarged object, and a video generation method by the imaging device can be provided.

MODE OF THE INVENTION

Figure 1:
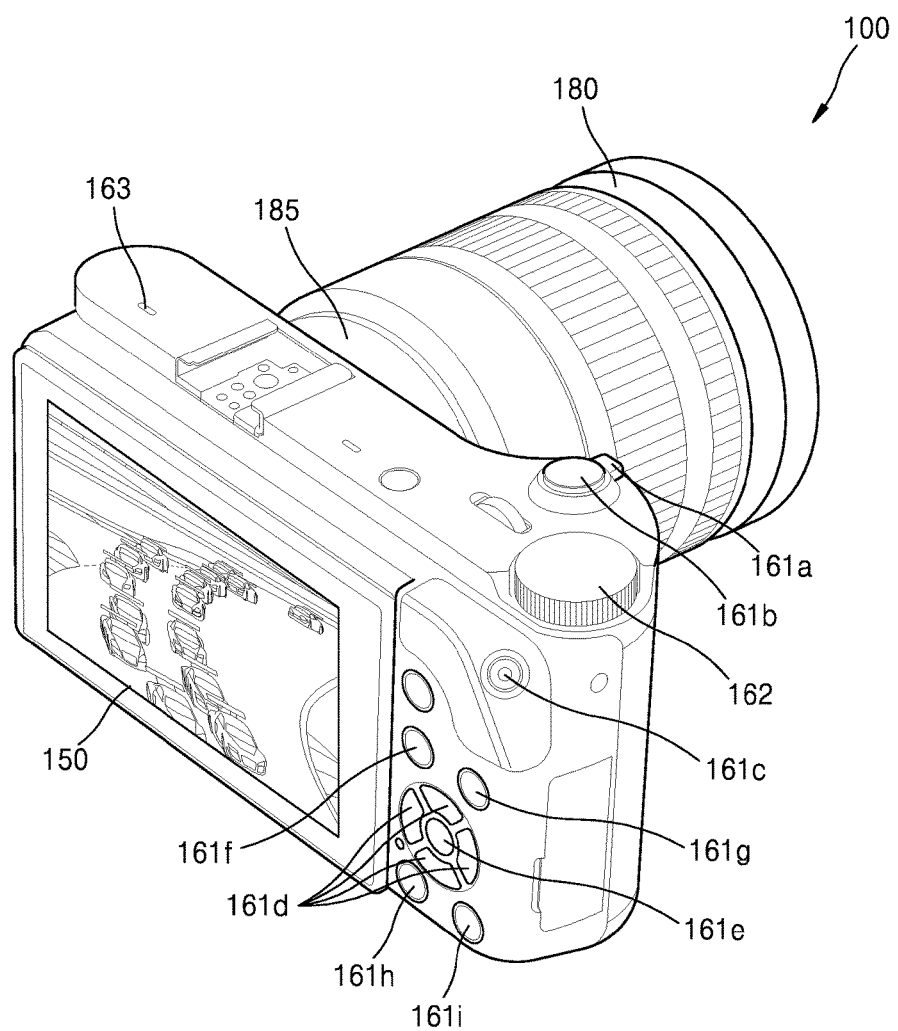
FIG. 1 is a schematic perspective view of an imaging device according to an example embodiment of the present invention.

Hereinafter, example embodiments of the present invention will be described in detail with reference to the attached drawings. Also, a way to manufacture and use the present invention will be described in detail with reference to the attached drawings. Like reference numerals or signs presented in each of the drawings denote part or elements for performing substantially the same functions.

It will be understood that, although the terms including ordinal numbers such as "first" and "second" may be used herein to describe various elements, these elements should not be limited by these terms. These terms are only used to distinguish one element from another element. For example, a first element could be termed a second element without departing from the teachings of example embodiments, and similarly, a second element could be also termed a first element. The term "and/or" includes any and all combinations of one or more of the associated listed items. "Touch" may include a touch in a touch screen, hovering, and physical button selection (pressing). "Resolution of a video including an object" may include 4 K or more resolution. "Resolution of a video including an object" may also include high definition (HD), or full high definition (FHD) resolution. Also, "resolution of a video including an enlarged object" may be lower than "resolution of a video including an object". For example, when "resolution of a video including the object" is 4 K resolution, resolution of an area of the enlarged object may be less than 4 K.

The terms used in the present specification are merely used to describe particular example embodiments, and are not intended to limit and/or restrict the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Like reference numerals in each of the drawings represent like elements for performing substantially the same functions.

FIG. 1 is a schematic front view of an imaging device according to an example embodiment of the present invention.

Referring to FIG. 1, an imaging device 100 images a plurality of motorcars that run along a track (for example, imaging a still image or video).

The imaging device 100 may include a lens 180 and a lens mount 185, which are disposed on the front of the imaging device 100, and a touch screen 150 and various buttons 161, which are disposed on the rear of the imaging device 100. Also, the imaging device 100 may include the buttons 161 and a mode dial 162, which are disposed on sides that connect the front and the rear of the imaging device 100. A user may set the imaging device 100 and/or may control functions of the imaging device 100 using the buttons 161 disposed on the sides and the rear of the imaging device 100.

The buttons 161 included in the imaging device 100 may be implemented with physical buttons or touch buttons (not shown) for detecting the user input using a contact sensor (not shown).

Figure 2:
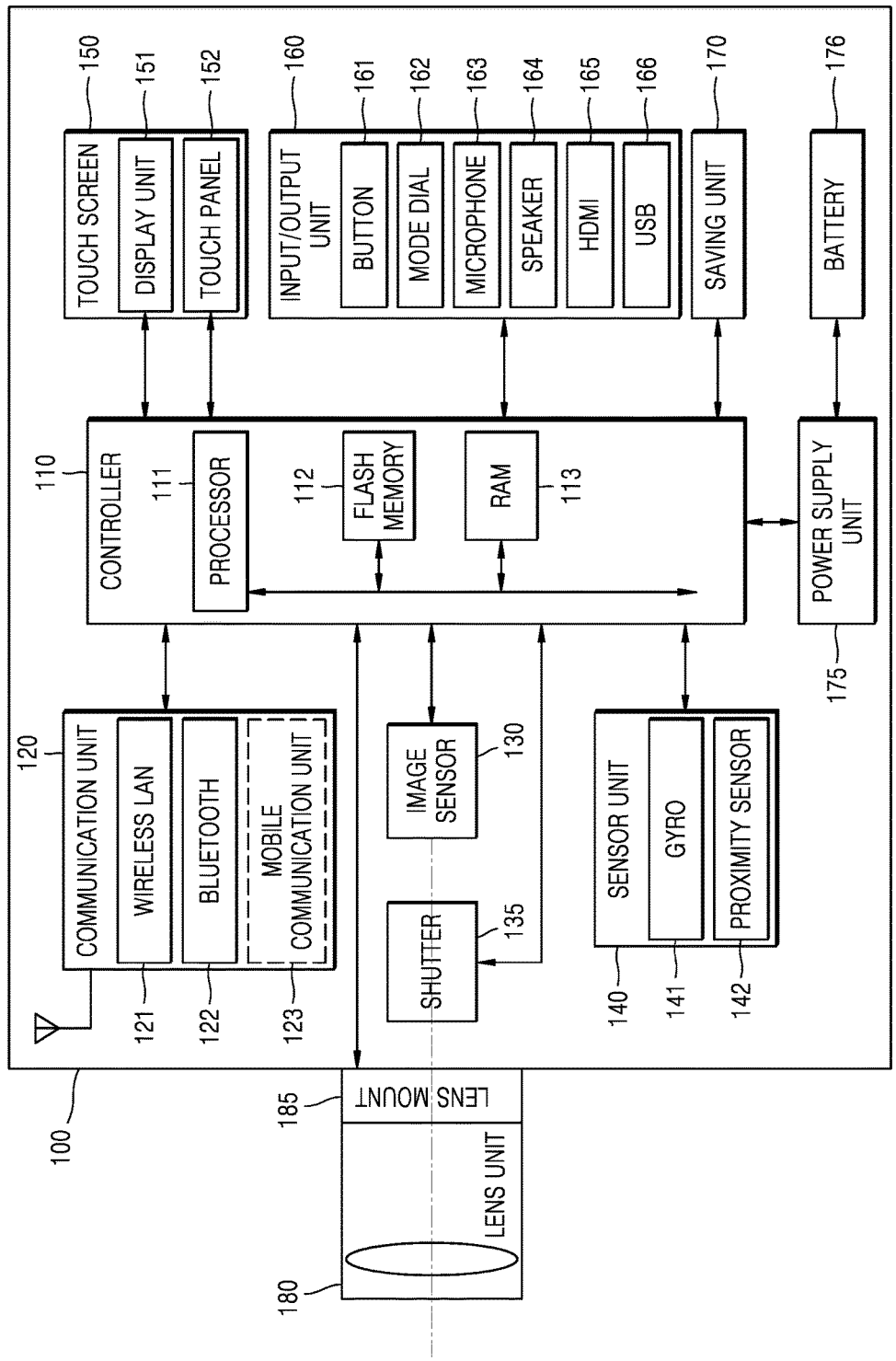
FIG. 2 is a schematic block diagram of the imaging device according to an example embodiment of the present invention.

The imaging device 100 includes an electronic device having an image sensor 130 (see FIG. 2). For example, the imaging device 100 may be implemented with a mobile phone having an image sensor, a smartphone, a tablet personal computer (PC), a digital camera, a camcorder, a lens-exchangeable digital single-lens reflex camera, or a lens-exchangeable mirror-less camera, and it will be easily understood by those skilled in the art that example embodiments of the present invention are not limited thereto. Also, the imaging device 100 may include an electronic device (not shown) capable of imaging a still image and/or video using one or a plurality of lenses or one or a plurality of lens group assemblies. The imaging device 100 may be formed integrally with or separated from the electronic device (not shown). For example, the separation type imaging device 100 may be connected to the electronic device (not shown) in a wired/wireless manner and may transmit/receive data made by the imaging device 100 (for example, a still image or video) and/or already-saved data (for example, a still image or video) to/from the electronic device (not shown).

FIG. 2 is a schematic block diagram of the imaging device according to an example embodiment of the present invention.

Referring to FIG. 2, the imaging device 100 may be connected to an external device (not shown) in a wired or wireless manner using a communication unit 120 or an input/output unit 160 by control of a controller 110. The external device (not shown) may include another imaging device, a display device, a portable device (for example, a mobile phone, a smartphone, a communication sensor, etc.) (not shown), a computer (not shown), a tablet PC (not shown), and a server (not shown).

The imaging device 100 includes the controller 110, the communication unit 120, an image sensor 130, a shutter 135, a sensor unit 140, a touch screen 150, the input/output unit 160, a saving unit 170, a power supply unit 175, a battery 176, and the lens mount 185. Also, the imaging device 100 may include the lens 180 that is detachable from the imaging device 100 and forms an image of light incident on the image sensor 130. Also, the imaging device 100 may be electrically connected to an external flash (not shown) capable of representing various effects of light.

The controller 110 may include a processor 111, flash memory 112 in which a control program for controlling the imaging device 100 is stored, and random access memory (RAM) 113 in which signals or data input from an outside of the imaging device 100 are stored or which is used as a storage area corresponding to various works performed by the imaging device 100.

The controller 110 performs a function of controlling the overall operation of the imaging device 100 and a signal flow between internal elements 120 through 185 of the imaging device 100 and processing data. The controller 110 controls elements 120 to 185 inside the imaging device 100 using power supplied through the power supply unit 190. Also, when there is the user's input or predetermined conditions are satisfied, the controller 110 may execute an installed operation system (OS) and various types of applications.

The processor 111 may include an image signal processor (ISP)(not shown) for processing an image corresponding to a still image or video. The ISP (not shown) may convert analog signals output from the image sensor 130 into digital signals and may perform image processing. Also, the ISP (not shown) may perform image processing (for example, various corrections and/or compression) on the digital signals converted by an additional analog-to-digital (A/D) converter between the image sensor 130 and the processor 1111. For example, image processing may include an auto exposure function for adjusting exposure automatically, an auto white balance function for adjusting white automatically, an auto focusing function for adjusting a focus of an object automatically, a color interpolation function, a color correction function, a color space conversion function, a gamma correction function, and/or an image formatter function.

Also, the processor 111 may include a graphic processing unit (GPU)(not shown) for processing graphics corresponding to a still image or video.

The processor 111 may be implemented with one system on chip (SoC) in which a core (not shown), the ISP (not shown) and the GPU (not shown) are formed. The processor 111 may include the core (not shown) and the ISP (not shown). The GPU (not shown) may be implemented separately from the processor 111. The processor 111 may include the core (not shown) and the GPU (not shown). The ISP (not shown) may be implemented separately from the processor 111. The processor 111, the ISP (not shown), and the GPU (not shown) may also be implemented separately from one another. The core of the processor 111 may include a single core, a dual core, a triple core, a quad core, or a multiple thereof. Also, the processor 111, the flash memory 112, and the RAM 113 may be connected to one another via an internal bus.

In an example embodiment of the present invention, the controller may be used as the term including the processor 111, the flash memory 112, and the RAM 113.

The controller according to an example embodiment of the present invention controls the imaging device 100 to display a video in a screen of the imaging device, to detect the user input from an object in the video and to display the object differently from other objects, to enlarge a first object area including the object into a second object area to correspond to the size of the screen and to display the enlarged object and to allow the object area to be cropped in the video and to be enlarged.

The controller according to an example embodiment of the present invention may control the imaging device in such a way that resolution of the second object area is displayed to be lower than that of the video.

The controller according to an example embodiment of the present invention may control the imaging device in such a way that the size of the first object area is changed by the user.

The controller according to an example embodiment of the present invention may control the imaging device in such a way that the video displayed on the screen is displayed by one of pressing a video imaging button of the imaging device and selection from a video list displayed on the screen.

The controller according to an example embodiment of the present invention may control the imaging device to track and display the object included in the second object area.

The controller according to an example embodiment of the present invention may control the imaging device to perform an auto exposure function and an auto focusing function corresponding to the object included in the second object area.

The controller according to an example embodiment of the present invention may control the imaging device to save the enlarged second object area including the tracked object.

The controller according to an example embodiment of the present invention may control the imaging device in such a way that a picture-in-picture (PIP) screen is displayed overlaying a portion of the enlarged first area, wherein the PIP screen is acquired by scaling the video.

The controller according to an example embodiment of the present invention may control the imaging device in such a way that the PIP screen is moved in the screen.

The controller according to an example embodiment of the present invention may control the imaging device in such a way that at least one of visual feedback and auditory feedback corresponding to enlargement into the second object area is provided.

It will be easily understood by those skilled in the art that the configuration and operation of the controller may be implemented in various ways according to example embodiments.

The communication unit 120 may connect the imaging device 100 to an external device by control of the controller. The imaging device 100 may transmit/receive data (for example, a still image or video) to/from the external device connected to the image device 100 via the communication unit 120 by control of the controller, may download an application from the external device or may perform web browsing. The communication unit 130 may include one among a wireless local area network (LAN) 131, Bluetooth 132, and wired Ethernet 133 in response to the performance and structure of the imaging device 100. Also, the communication unit 130 may include a combination of the wireless LAN 131, Bluetooth 132, and wired Ethernet 133. Also, the communication unit 120 may further include other near communication (for example, near field communication (NFC)(not shown)) or bluetooth low energy (BLE)(not shown).

The image sensor 130 converts light that is reflected from the object and incident on the image sensor 130 through the lens 180, into electrical signals by control of the controller. The electrical signals may be analog or digital electrical signals. The converted electrical signals are output to the controller. Also, the converted electrical signals are output to the ISP. The image sensor 130 may include a charge coupled device (CCD) type image sensor or a complementary metal-oxide semiconductor (CMOS) type image sensor.

The shutter 135 adjusts the amount of light incident onto the image sensor 130 using a shutter opening/closing speed by control of the controller. As the opening/closing speed of the shutter 135 increases, a small amount of light may be incident on the image sensor 130, and as the opening/closing speed of the shutter 135 decreases, a large amount of light may be incident on the image sensor 135. The controller may adjust the opening/closing speed of the shutter 135 using a shutter actuator (not shown) and a shutter controller (not shown).

The sensor unit 140 includes at least one sensor that detects the state of the imaging device 100. For example, the sensor unit 170 may include a gyro sensor 141 that detects a direction using rotational inertia of the imaging device 100 and a proximity sensor 142 that detects a degree of proximity with respect to the user's imaging device 100. Also, the sensor unit 140 may include an acceleration sensor (not shown) that detects inclination of three axes (for example, x-axis, y-axis, and z-axis) applied to the imaging device 100, a gravity sensor (not shown) that detects an action direction of gravity, and a fingerprint sensor (not shown) for user authentication.

At least one sensor included in the sensor unit 140 detects the state of the imaging device 100, generates signals corresponding to detection, and transmits the generated signals to the controller. The controller may control functions and/or settings of the imaging device 100 corresponding to the state of the imaging device 100 detected by the sensor unit 140.

It will be easily understood by those skilled in the art that the sensor of the sensor unit 140 may be added or deleted depending on the performance of the portable device 100.

The touch screen 150 includes a display unit 151 and a touch panel 152. The touch screen 150 may provide a graphical user interface (GUI) corresponding to various services (for example, imaging an image or video, seeing a saved image or video or executing an application) to the user. In the example embodiment of the present invention, the screen may be used as the term including a screen of the touch screen 150 or a screen of the display unit 152. The size of the screen may be diverse according to the imaging device 100. For example, a diagonal length of the screen may be 30 mm or more. In the case of a portable terminal device, the diagonal length of the screen may be 300 mm or less. Also, in the case of a display device, the diagonal length of the screen may be 2,150 mm or less.

The display unit 151 may include a display controller (not shown). Also, the display controller (not shown) may be separately disposed between the controller and the display unit 151. The touch screen 150 transmits analog signals corresponding to a single touch or multi-touch input through the touch panel 152 to a touch panel controller (not shown). The touch screen 150 may receive a single touch or multi-touch from an input unit (not shown) including the user's body (for example, a finger including a thumb) or a stylus.

The touch screen 150 is not limited to a contact of the user's body or the input unit (not shown) with the touch panel 152 in addition to touch and may include a non-contact (for example, hovering in which a distance between the touch panel 152 and the user's body or the input unit (not shown) is 50 mm or less). It will be easily understood by those skilled in the art that the distance of hovering that is detachable from the touch screen 150 may be changed according to the performance or structure of the imaging device 100.

The touch panel 152 may be implemented with a resistive type touch panel, a capacitive type touch panel, an infrared type touch panel, or an acoustic wave type touch panel, for example. Also, the touch screen 150 may further include an electromagnetic resonance (EMR) panel that may detect input of the input unit (not shown) in addition to the touch panel 152.

The touch panel controller (not shown) converts the analog signals corresponding to the single touch or multi-touch received from the touch panel 152 into digital signals (for example, X- and Y-coordinates corresponding to a detected touch position). The controller may also calculate the X- and Y-coordinates corresponding to the touch position on the touch screen 150 using the digital signals received from the touch panel controller (not shown).

The controller may control the display unit 151 of the touch screen 150 using the digital signals received from the touch panel controller (not shown). For example, the controller may display an item (for example, 5472X3646(3:2) (not shown)) corresponding to a function (for example, setting of a photo size) displayed on the display unit 151 corresponding to the input touch differently from other items (2976X1984(3:2)(not shown), for example, 191b to 191h. Also, the controller may execute an application (not shown) corresponding to a shortcut icon (not shown) selected in response to the input touch and may display the application on the display unit 151.

The touch panel controller (not shown) may include one or a plurality of touch panel controllers (not shown). The touch panel controller (not shown) and/or the display controller (not shown) may also be included in the controller in response to the performance or structure of the imaging device 100.

The imaging device 100 may have only the display unit 151 without including the touch panel 152 and the touch panel controller (not shown). The imaging device 100 may not detect the user input.

The input/output unit 160 may receive contents (for example, an image, a video, voice, music, data (for example, a playback instruction)) from an outside of the imaging device 100 by control of the controller. The input/output unit 160 may include a button 161, a mode dial 162, a microphone 163, a speaker 164, a high-definition multimedia interface (HDMI) input port 165, and a universal serial bus (USB) input jack 164. Also, the input/output unit 160 may include a combination of the button 161, the mode dial 162, the microphone 163, the speaker 164, the HDMI input portion 165, and the USB input jack 164.

The button 161 may perform the functions of the imaging device 100 or change settings thereof. For example, the button 161 may include a power switch 161a, a shutter button 161b, a video imaging button 161c, a navigation button 161d, an ok button 161e, a menu button 161f, a playback button 161h, a delete/custom button 161i, and an Fn button 161g. The power switch 161a may include an On/Off power button (not shown).

The mode dial 162 may change an imaging mode (for example, a program preferred mode, a shutter preferred mode, etc.) of the imaging device 100. The imaging device 100 may image a still image or video in an imaging mode selected by the user by control of the controller.

The microphone 163 receives the user's uttered voice. The microphone 163 may convert the received voice into electrical signals using an audio codec and may output the electrical signals to the controller. The user's voice may include voice corresponding to the menu or functions of the imaging device 100. The controller may control the functions and/or settings of the imaging device 100 using the received voice. The range of recognition of the microphone 163 may be 4 m or less from the microphone 163 to the user's location and may change in response to the user's voice volume and a peripheral environment (for example, speaker sound, peripheral noise).

The microphone 163 may be formed integrally with the imaging device 100 or separated from the imaging device 100. The separated microphone (not shown) may be electrically connected to the imaging device 100 using the communication unit 120 or the input/output unit 160.

The speaker 164 outputs audio (for example, voice, sound, an audio file, a music file) received through the microphone 163 by control of the controller by using the audio codec. The speaker 164 may output audio input through the communication unit 120 or the input/output unit 160. Also, the speaker 164 may output the audio saved in the saving unit 170 by control of the controller. The speaker 164 may include at least one of a headphone output terminal (not shown) and an S/PDIF output terminal (not shown).

According to an example embodiment of the present invention, the speaker 164 may output auditory feedback (for example, an audio file, etc.) corresponding to enlargement of the object area by control of the controller.

The HDMI input port 165 may transmit/receive data to/from an external device (for example, a display device) that may be connected to the HDMI input port 165 by control of the controller. For example, the display deice may be implemented with an analog TV, a digital TV, a 3D-TV, a smart TV, a light emitting diode (LED) TV, an organic light emitting device (OLED) TV, a plasma TV, a monitor, a curved TV having a screen with a fixed curvature, a flexible TV having a screen with a fixed curvature, a bended TV having a screen with a fixed curvature, and/or a curvature changeable TV in which a curvature of a current screen may be changed by the received user's input. However, it will be easily understood by those skilled in the art that example embodiments of the present invention are not limited thereto.

The USB input jack 166 may transmit/receive data to/from the external device that may be connected to the USB input jack 166 by control of the controller.

The saving unit 170 may save various data, a control menu, a program, or an application for driving and controlling the imaging device 100 by control of the controller. The saving unit 170 may save input/output signals or data corresponding to driving of the communication unit 120, the image sensor 130, the shutter 135, the sensor unit 140, the touch screen 150, the input/output unit 160, and the power unit 190. Also, the saving unit 170 may save a control program for controlling the imaging device 100 and the controller, an application initially provided by a manufacturer or downloaded from the outside, a graphical user interface (GUI) associated with the application, an object for providing GUI (for example, an image text, an icon, a button, etc.), user information, a document, databases, or pieces of related data.

In an example embodiment of the present invention, the term "saving unit" includes the saving unit 170, the flash memory 112 and/or the RAM 113 of the controller.

The saving unit may include a memory card mounted on the imaging device 100 (for example, a micro secure digital (SD) card or a USB memory (not shown)). Also, the saving unit may include a non-volatile memory, a volatile memory, a hard disk drive (HDD), or a solid state drive (SSD).

The saving unit may include a broadcasting communication control module, a camera control module, a voice recognition module, a motion recognition module, a volume control module, a display control module, an audio control module, an input/output control module, a power control module, a voice database (DB), or a motion DB, which is not shown in the drawings. The unillustrated modules and databases of the saving unit may be implemented with the form of software so as to perform a communication control function, a camera function, a voice recognition function, a motion recognition function, a volume control module, a display control function, an audio control function, an external input control function, or a power control function in the imaging device 100. The controller may perform each of the functions using the software saved in the saving unit.

The saving unit may save a still image, a video and/or additional information imaged by the imaging device 100 by control of the controller.

The saving unit may save a still image and/or video corresponding to the video list displayed on the touch screen 150 of the portable device 100 by control of the controller.

The saving unit may save selection information corresponding to video imaging button selection (for example, pressing) by control of the controller.

The saving unit may save each of pieces of touch position information corresponding to first through fourth touches by control of the controller.

The saving unit may save visual feedback and/or auditory feedback corresponding to enlargement of the second object area by control of the controller.

The saving unit may save lens information received from the lens 180 by control of the controller.

It will be easily understood by those skilled in the art that the saving unit may save various information and signals for example embodiments of the present invention by control of the controller.

The power supply unit 175 supplies power input from an external power supply source to elements 120 through 180 inside the imaging device 100 by control of the controller. Also, the power supply unit 175 may supply power input from the external power supply source to the battery 176 so that the battery 176 may be charged, by control of the controller.

The lens unit 180 concentrates incident light (for example, the object) onto the image sensor 130. The lens unit 180 may include a lens controller (not shown) for controlling the lens unit 18, a memory (not shown), a diaphragm (not shown), one or a plurality of lens groups (not shown) for zooming and focusing, an actuator (not shown) that moves one or a plurality of lens groups (not shown) in a direction of an optical axis, and an optical image stabilization (OIS) module (not shown). The memory (not shown) may save related information of the imaging device 100 received from the imaging device 100 by control of the lens controller (not shown).

The lens 180 and the imaging device 100 are coupled to each other through the lens mount 185. The lens 180 is electrically connected to the controller through the lens mount 185. The lens information stored in the memory (not shown) of the lens 180 through the lens mount 185 is transmitted to the imaging device 100 by control of the controller. Also, the controller (not shown) of the lens 180 may transmit the lens information stored in the memory (not shown) to the imaging device 100. For example, the lens information may include an identifier of the lens 180, a model name, a caliber of a lens, zooming status information, diaphragm information, OIS information, or focusing information, etc.

Also, the information (for example, a manufacturer, an identifier, etc.) of the imaging device 100 saved in the saving unit of the imaging device 100 through the lens mount 185 may be transmitted to the lens 180.

In FIG. 2, the imaging device 100 may be coupled to the lens unit 180 through the lens mount 185. However, example embodiments of the present invention are not limited thereto. For example, the imaging device 100 may be formed integrally with the lens unit 180. When the imaging device 100 and the lens unit 180 are formed integrally, part of the elements of the lens unit 180 (for example, the lens controller, the memory, etc.) may be added or deleted.

Also, the imaging device 100 may include a global positioning system (GPS) unit (not shown). The GPS unit (not shown) periodically receives information (for example, position information and time information of a GPS satellite that may be received from the portable device 100) from a plurality of GPS satellites (not shown) on the earth's orbit. The imaging device 100 may recognize position, moving speed or time of the imaging device 100 using the information received from the plurality of GPS satellites.

At least one of the elements (for example, 110 to 176) shown in the imaging device 100 of FIGS. 1 and 2 may be added or deleted in response to the performance of the imaging device 100. Also, it will be easily understood by those skilled in the art that positions (for example, 110 to 176) of the elements may be changed in response to the performance or structure of the imaging device 100.

Figure 3A:
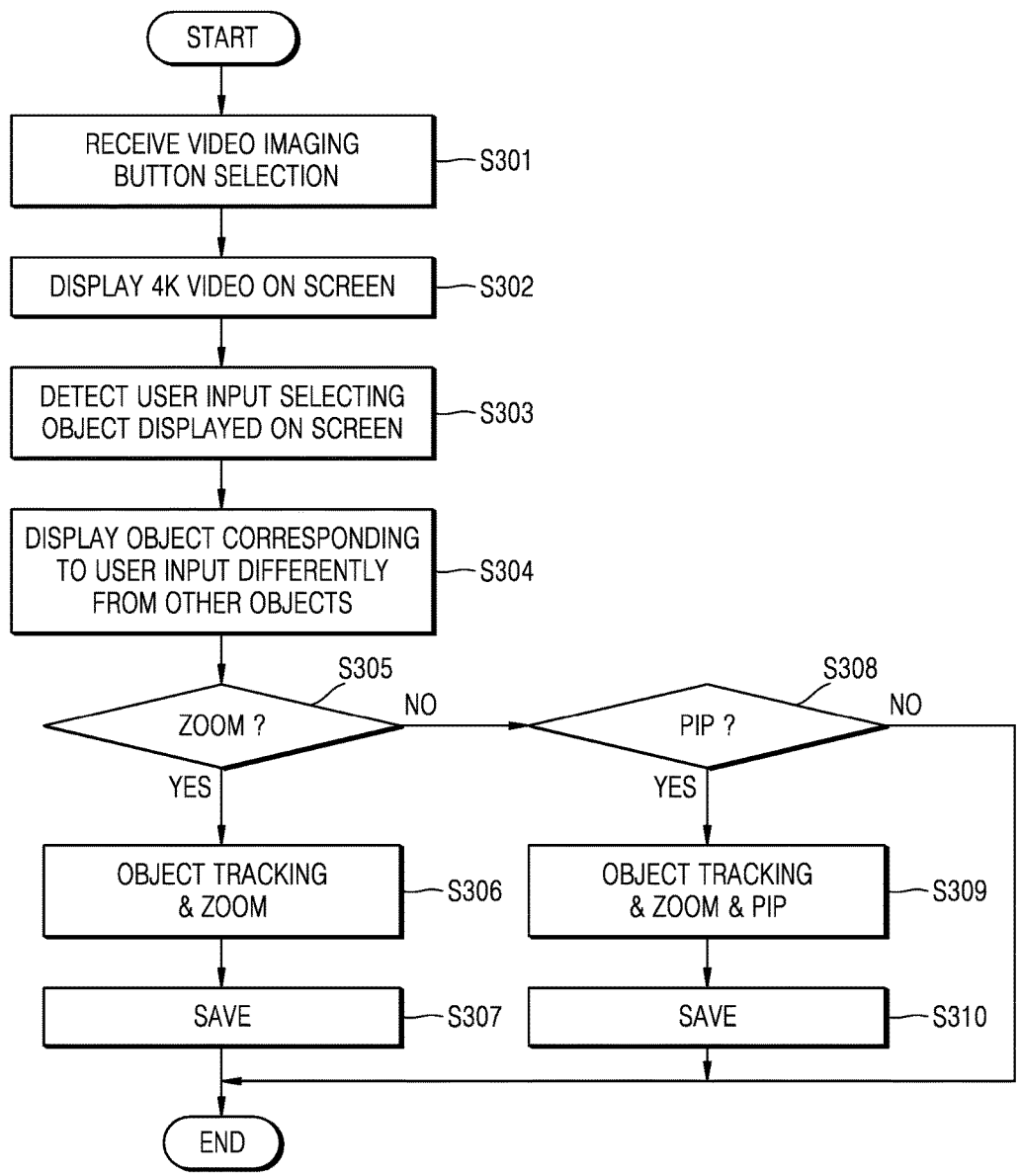
FIG. 3A is a schematic flowchart illustrating a video generation method by an imaging device according to an example embodiment of the present invention.

FIG. 3A is a schematic flowchart illustrating a video generation method by an imaging device, according to an example embodiment of the present invention.

FIGS. 4A through 4H are views of examples of a video generation method by an imaging device according to an example embodiment of the present invention.

FIGS. 5A through 8B are views of examples of a video generation method by an imaging device according to another example embodiment of the present invention.

In Operation S301 of FIG. 3A, video imaging button selection is received.

Figure 4A:
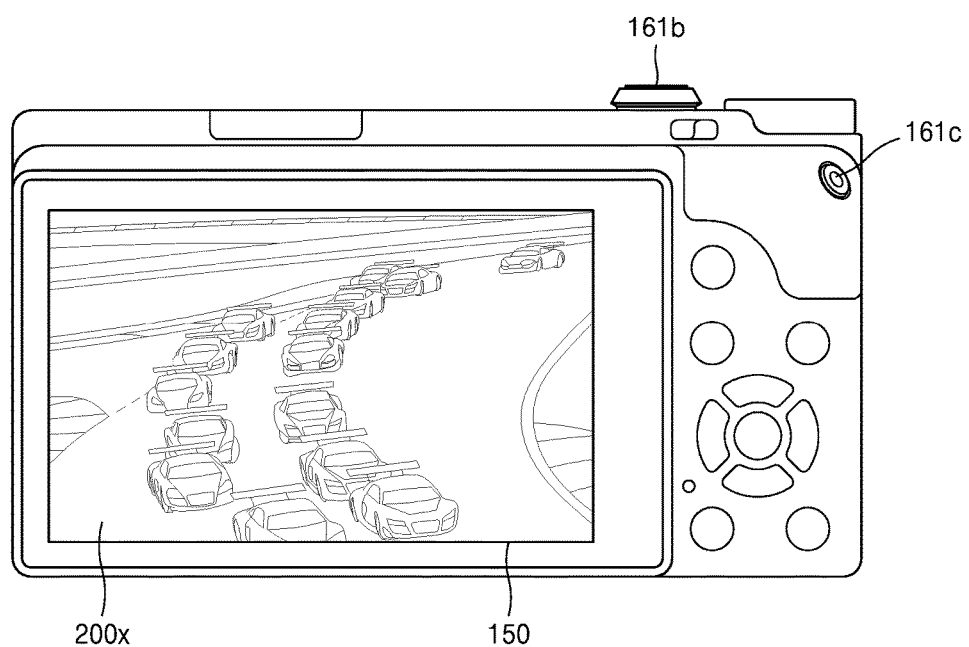
FIGS. 4A through 4H are views of examples of a video generation method by an imaging device according to an example embodiment of the present invention.

Referring to FIG. 4A, when a power switch 161*a* of the imaging device 100 is moved by the user to a positon of On, power is supplied to the imaging device 100. The touch screen 150 of the imaging device 100 is also activated by the supply of power. When the imaging device 100 is directed by the user toward the object, a continuous live view 200*x* including the object to be imaged is displayed on the touch screen 150.

Figure 4B:
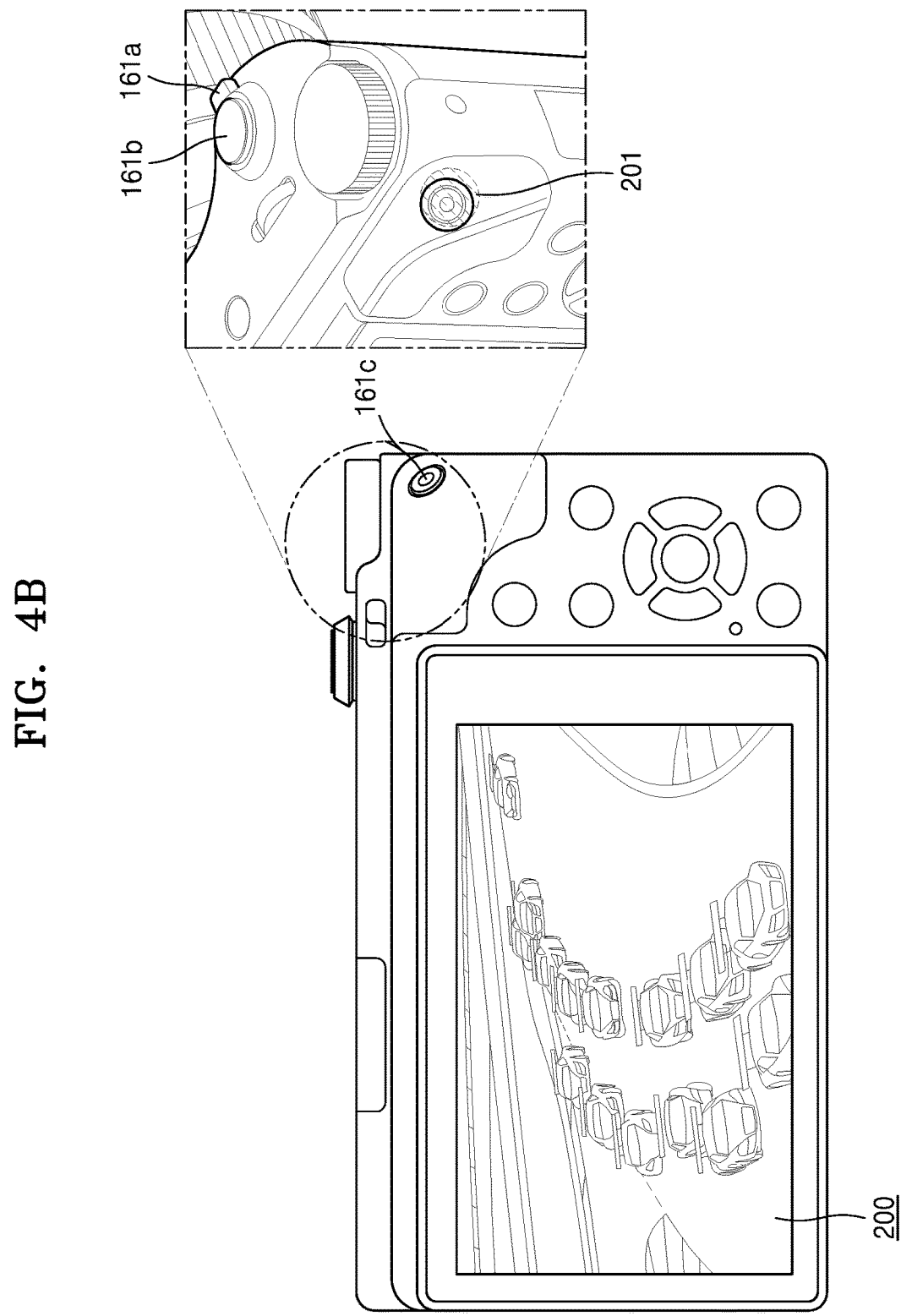

Referring to FIG. 4B, the video imaging button 161*c* of the imaging device 100 is pressed by a touch 201 of the user. The imaging device 100 may image the live view 200*x* using the lens 180, the image sensor 130 and/or the controller with 4 K resolution. The controller may perform image processing on the input live view 200*x*. The controller scales an image-processed video 200 and displays the scaled video on the touch screen 150. Also, the controller may save or temporarily save the video 200 having 4 K resolution corresponding to the live view 200x imaged from the time at which the touch 201 is detected, in the saving unit.

The imaging device 100 may image a still image and/or video having ultra high definition (UHD) resolution that is about four times FHD resolution. UHD resolution may include 4096×2160 pixels or 3840×2160 pixels.

The imaging device 100 may image a still image and/or video having 8 K resolution that is about four times UHD resolution (for example, 8000×4000 pixels before and after). 8 K resolution may include 8192×4320 pixels or 768×4320 pixels. FHD resolution, 4 K resolution or 8 K resolution is one among resolutions that may be imaged by the imaging device 100. It will be easily understood by those skilled in the art that example embodiments of the present invention are not limited thereto.

The saving unit may save button selection information (for example, a button name, a button selection time, etc.) corresponding to video imaging button selection (for example, pressing) by control of the controller. The controller may also display a video imaging starting time on the touch screen 150 using the saved selection information.

Figure 5A:
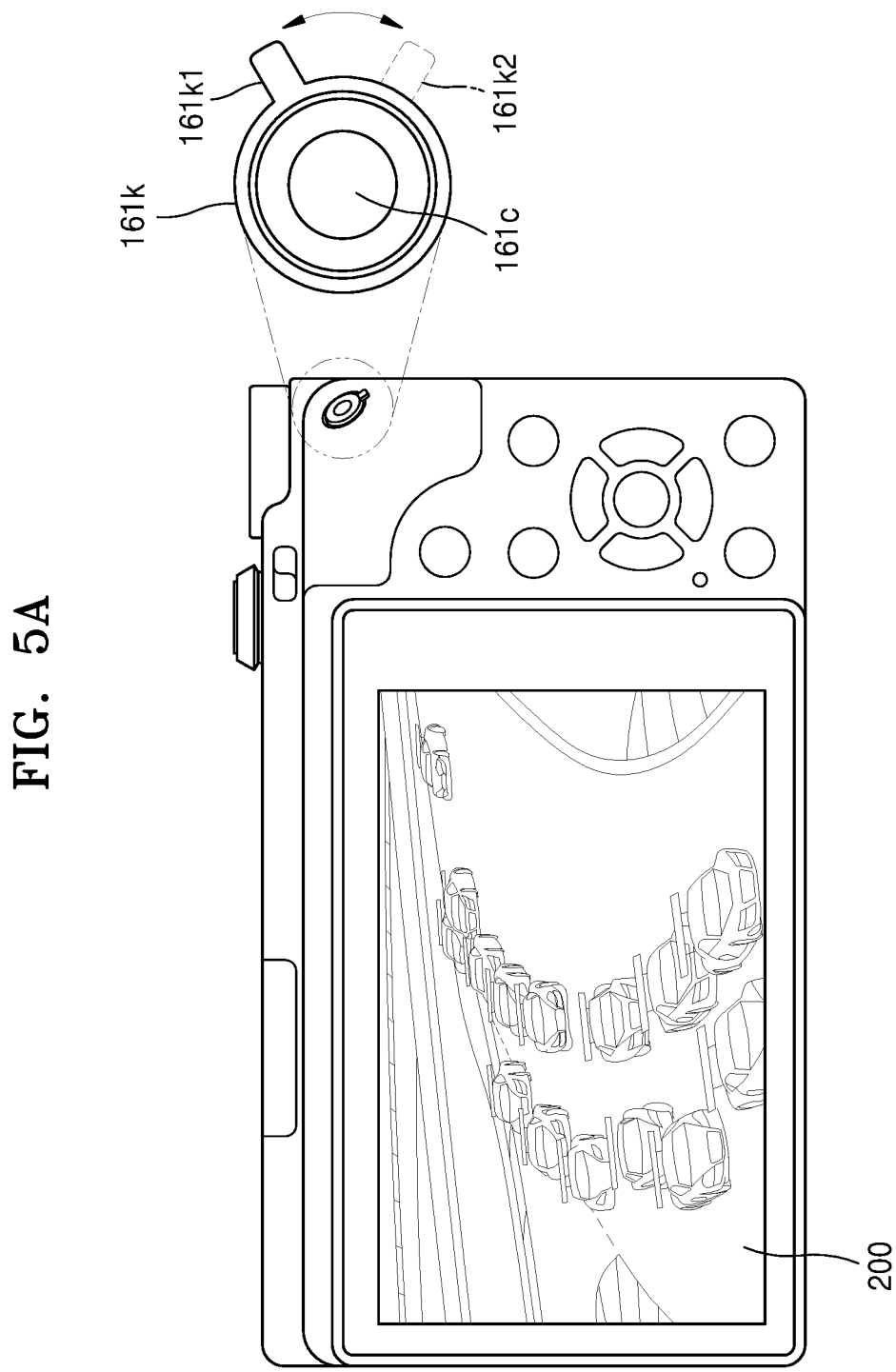
FIGS. 5A through 8B are views of examples of a video generation method by an imaging device according to another example embodiment of the present invention.
Figure 5B:
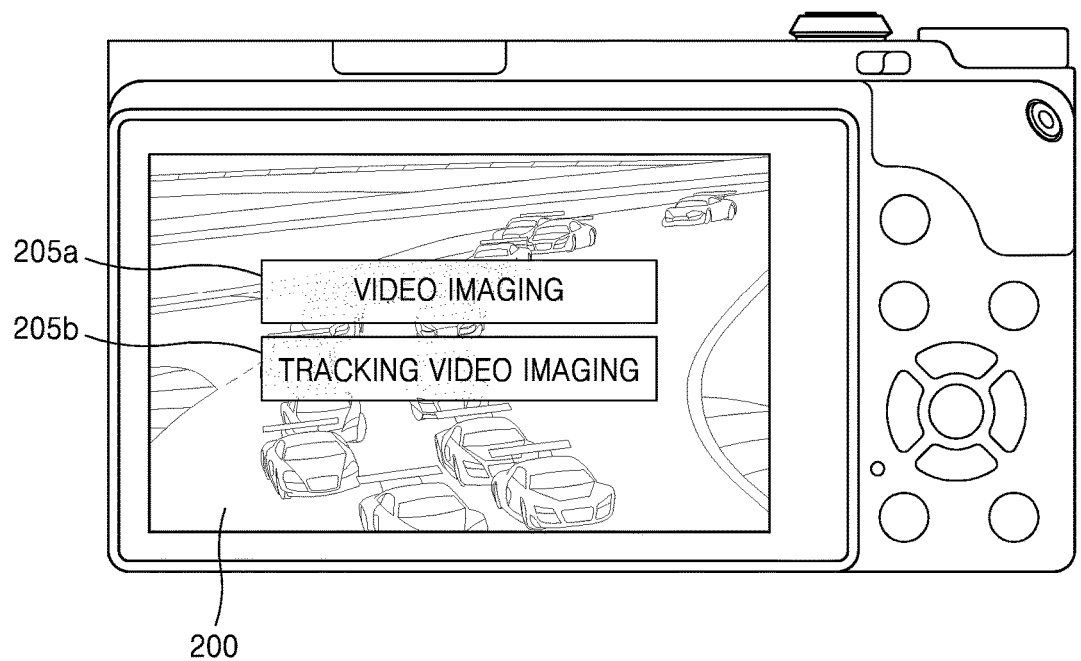
Figure 5C:
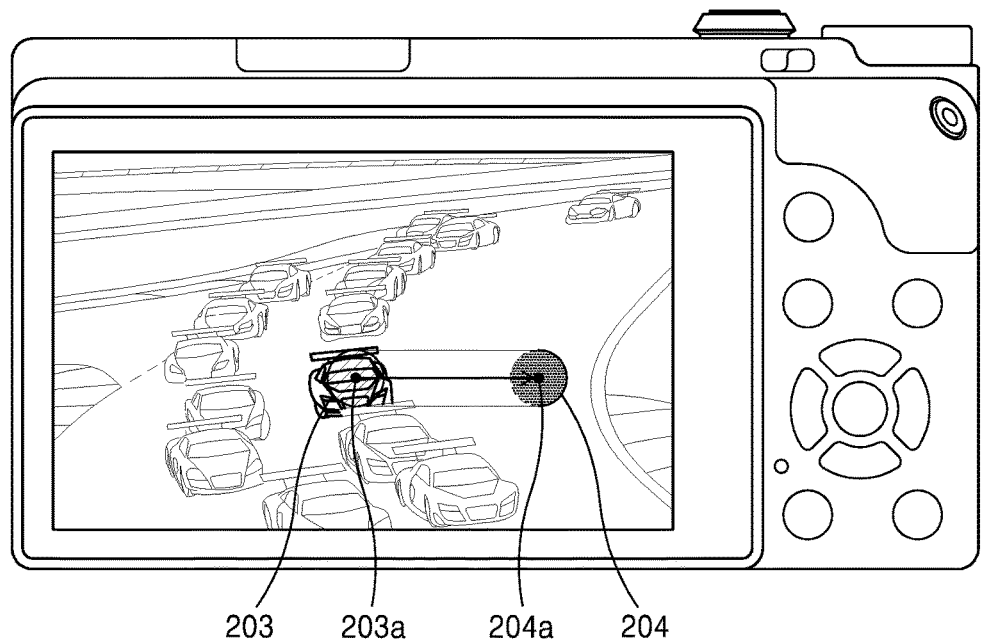

Referring to FIGS. 5A through 5C, an example of trigger of the video generation method according to another example embodiment of the present invention is shown.

In FIG. 4B, the controller may image a video 200 according to determined settings (for example, video imaging, whereby the selected object is enlarged and tracked when the video imaging button 161c is pressed). When a touch 203 of the user is detected from the object 202 during video imaging, the controller may enlarge the object area 210 including the object 202 from which the touch 203 is detected.

Referring to FIG. 5A, the video imaging button 161c may further include a video mode switch 161k corresponding to a video mode. A protrusion of the video mode switch 161k may be moved between a first position 161k1 and a second position 161k2. When the video mode switch 161k is placed in the first position 161k1, the controller performs video imaging in a normal video mode (for example, a mode in which video imaging of enlarging and tracking the selected object is not possible). Also, when the video mode switch 161k is placed in the second position 161k2, the controller performs video imaging in a tracking video mode (for example, a mode in which video imaging of enlarging and tracking the selected object is possible).

The user may first select the video mode using the video mode switch 161k and may press the video imaging button 161c. Also, the user may first press the video imaging button 161c and may select the video mode using the video mode switch 161k.

An outer diameter of the video imaging button 161c is smaller than that of the video mode switch 161k.

Referring to FIG. 5B, when the video imaging button 161c of the imaging device 100 is pressed by the touch 201 of the user, a pop-up 205 corresponding to the video mode is displayed on a screen. The pop-up 205 corresponding to the video mode may include normal video imaging 205a and tracking video imaging 205b. When tracking video imaging 205b is selected by the user from the pop-up 205, the controller may perform video imaging in the tracking video mode. When the normal video imaging 205a is selected by the user from the pop-up 205, the controller may perform normal video imaging in the normal video mode. Also, when the imaging device 100 further includes a supportable video mode, the number of pop-up 205 to be displayed may be changed.

Referring to FIG. 5C, when the video imaging button 161c of the imaging device 100 is pressed by the touch 201 of the user, the imaging device 100 is set to perform video imaging in the normal video mode. A continuous motion of the touch in the object 202 may be input by the user to the screen in which a video is displayed.

The controller may detect the continuous motion of the touch 203 that contacts the touch screen 150 using the touch screen 150 and a touch screen controller (not shown). A touch gesture that contacts the touch screen 150 may be one or a plurality of touch gestures.

A continuous motion of one touch 203 includes movement from a detection positon 203a of the initial touch 203 to a detection position 204a of the final touch 204. Also, the continuous motion of one touch 203 means maintaining contact with the touch screen 150 continuously from the detection position 203a of the initial touch 203 to the detection position 204a of the final touch 204. The continuous motion of one touch 203 is separated from the touch screen 150 in the detection position 204a of the final touch 204.

Referring to FIG. 5C, the continuous motion of one touch 203 may include one selected from the group consisting of touch gestures, such as flick, swipe, double tap, and rotation.

An example of trigger of the video generation method according to another example embodiment of the present invention is shown in addition to FIGS. 5A through 5C. For example, the controller may change the normal video mode into the tracking video mode using the microphone 163 and a voice recognition module (not shown), which receive the input user's voice. The controller may image the video in the changed tracking video mode.

In Operation S302 of FIG. 3A, a 4 K video is displayed on the screen.

Figure 4C:
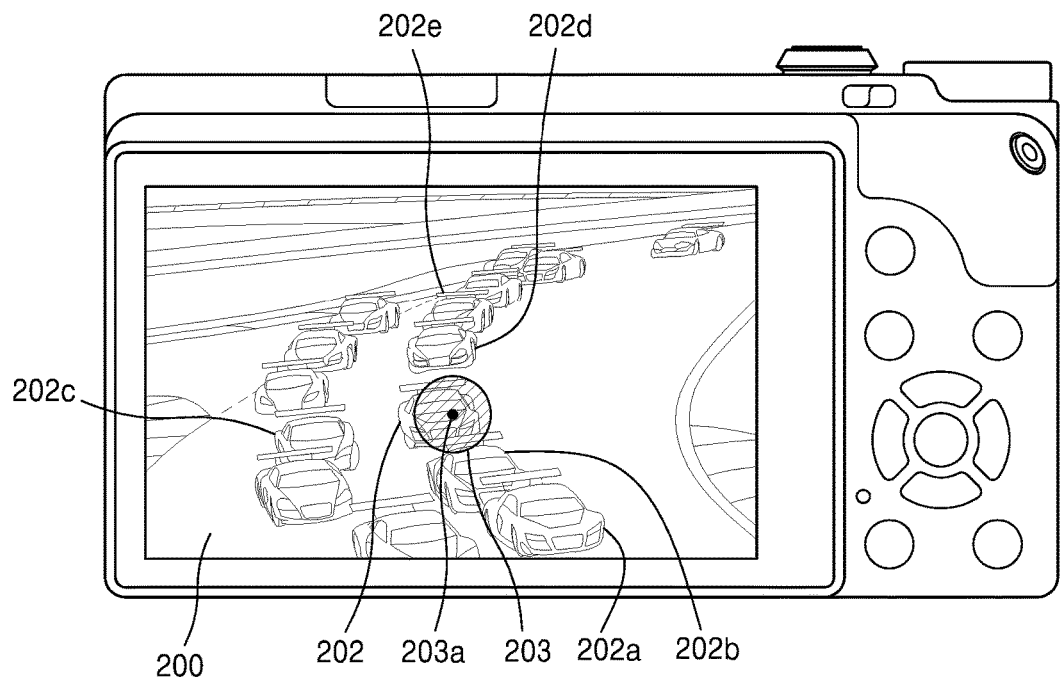

Referring to FIGS. 4B and 4C, the video 200 is displayed on the screen of the imaging device 100 by control of the controller. The video 200 is image-processed and displayed to correspond to the size of the screen by control of the controller. The video may be displayed in 60 frames or 30 seconds per second. The displayed video 200 may be displayed with various sizes corresponding to the size of the screen (for example, the size of a diagonal of the screen) of the imaging device 100. The displayed video 200 may include various objects (for example, motorcars in a race, tracks, etc.). The object displayed in the video 200 may be selected by the user input. The object displayed in the video 200 may be a moving object. Also, the object displayed in the video 200 may be selected by buttons (for example, see 161d and 161e, see FIG. 1) of the imaging device.

In Operation S303 of FIG. 3A, the user input is detected from the object displayed in the screen.

Referring to FIG. 4C, the object 202 among a plurality of objects (for example, 202 to 200e) displayed in the screen is touched by the user (or an input unit). The controller detects the first touch 203 in the screen through the touch screen 150 and the touch screen controller (not shown). The controller receives first position information (for example, X1- and Y1-coordinates corresponding to 203a) corresponding to the first touch 203 from the touch screen controller (not shown).

Also, hovering of the user (or the input unit) may be detected from the object 202 displayed in the screen. The controller may detect hovering from the screen using the touch screen 150 and the touch screen controller (not shown). The controller may receive $11^{th}$ position information (for example, X11- and Y11-coordinates) corresponding to hovering detected from the touch screen controller (not shown).

The controller may save the touch position 203a on the touch screen 150 included in the received first position information, a touch detection time (for example, 14:17), and touch additional information (for example, a touch input, etc.) corresponding to a touch in the saving unit. Also, the controller may save a hovering position on the touch screen 150 included in the received 11$^{th}$ position information, a touch detection time (for example, 14:18), and hovering additional information (for example, a hovering height, etc.) corresponding to a touch in the saving unit.

The touch 203 that contacts the touch screen 150 may be generated by one of fingers including a thumb or a touchable input unit, for example. It will be easily understood by those skilled in the art that the number of touches that may be detached by the controller may be changed in response to the performance or structure of the touch screen 150 and/or the touch screen controller (not shown) of the imaging device 100.

In Operation S304 of FIG. 3A, the object corresponding to the touch is displayed on the screen differently from other objects.

Figure 4D:
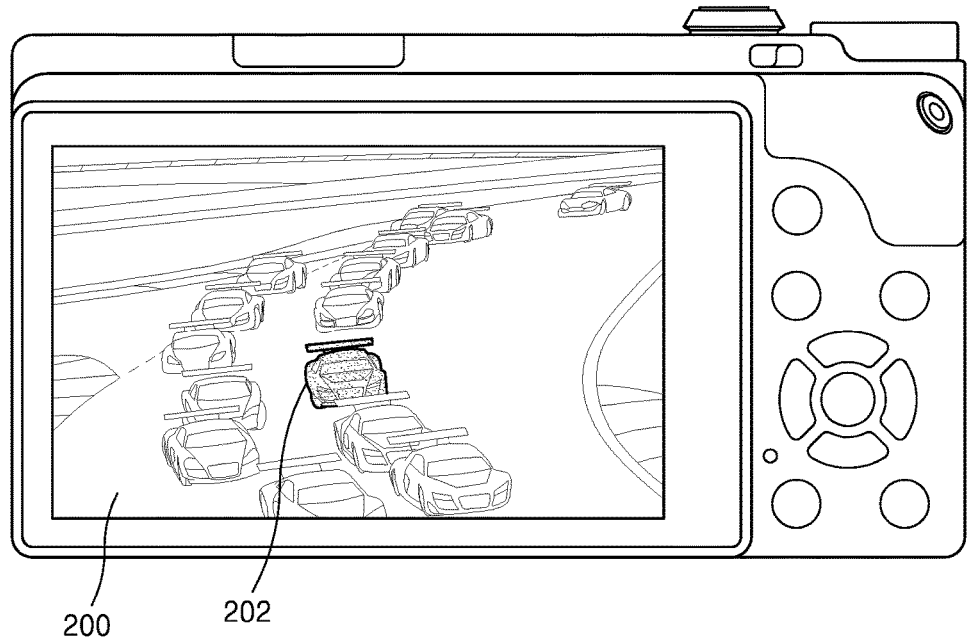
Figure 6:
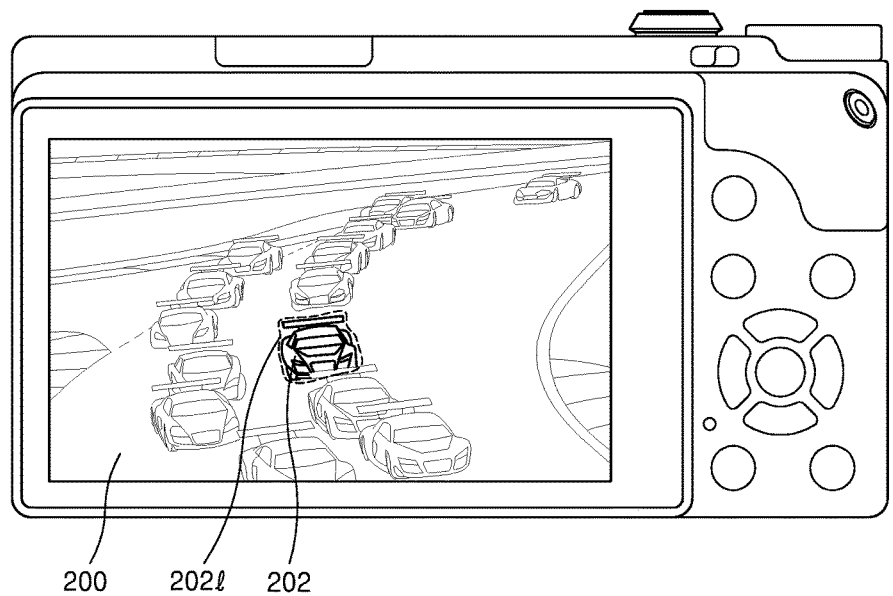

Referring to FIGS. 4D and 6, the object 202 from which the touch 203 is detected, is displayed differently from other objects 202a to 202e. Displaying of the object 202 differently from other objects may include displaying of highlighting of the object 202, displaying of glimmering of the object 202, displaying an edge of the object 202 to be thick, displaying a line 202l spaced apart from the edge of the object 202 (for example, by a distance of 5 mm or less), displaying contrast of the object 202 to be large, displaying turnover indication of the object 202, displaying of underlining the object 202 and/or displaying the object 202 in a different color, for example. Displaying of the object 202 differently from other objects 202a to 202e may be displayed in a limited region (for example, within a distance of 10 mm based on the edge of the object 202) by control of the controller. It will be easily understood by those skilled in the art that methods of displaying the above-described object 202 from other objects 202a to 202e are not limited thereto and may be performed in various ways.

In Operation S305 of FIG. 3A, the object from which the touch is detected, is enlarged.

Figure 4E:
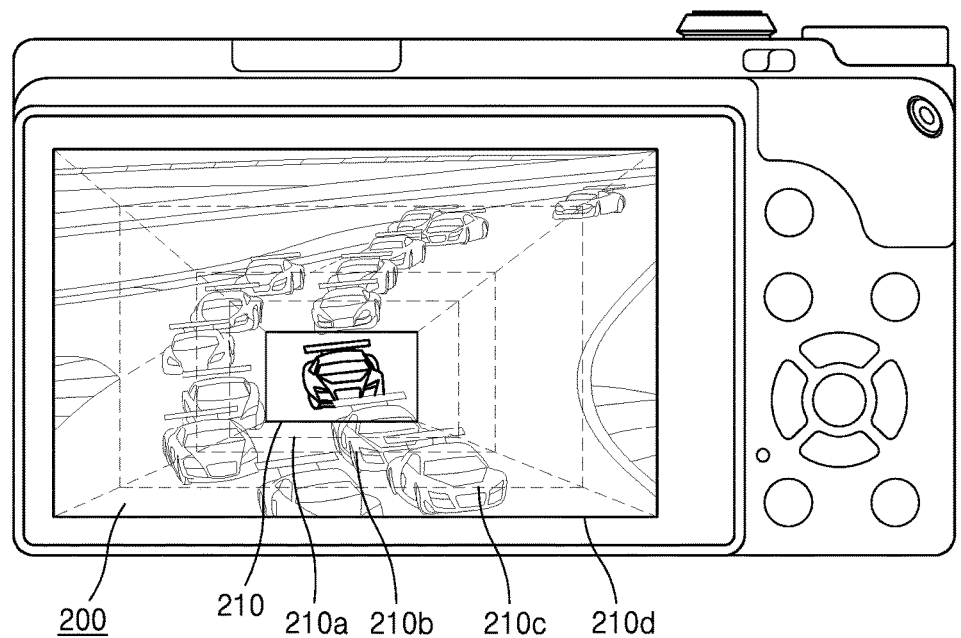

Referring to FIG. 4E, an object area 210 including the object 202 from which the touch is detected, is enlarged by control of the controller. When a set time (for example, 500 ms, which may be changed by the manufacturer or the user) at which the object 202 is displayed differently from other objects 202a to 202e elapses, the object area 210 may be enlarged to correspond to a gradually-determined size (for example, the size of the screen) by control of the controller.

The controller may display visual feedback 210 to 210d in which the object area 210 in a current position is enlarged into the determined size (for example, 800×480 pixels). The visual feedback 210 to 210d may be enlarged into the determined size 210d from the current size 210 based on the object area 210. The visual feedback 210 to 210d may be gradually enlarged from the current size to the determined size 210d of the object area 210 at constant velocity. The visual feedback 210 to 210d may be enlarged into the determined size 210d based on a central positon of the object area 210.

When the central position of the object area 210 is not a central positon of the screen, an enlargement rate of the visual feedback 210 to 210d based on vertices of the object area 210 may be changed according to the vertices of the object area 210. When an imaginary line from the vertices of the object area 210 to vertices of the corresponding screen is connected, positions of the vertices of the gradually-enlarged object area 210 may be different from each other. For example, the distances from the vertices of the object area 210 to the central position of the screen may be greater than the distances from the vertices of the object area 210 to the central position of the corresponding screen (e.g., an enlarged image).

According to another example embodiment of the present invention, the controller may move the object area 210 in the current position to the central positon of the screen. The controller may display visual feedback (not shown) in which the object area 210 moved to the central position of the screen is gradually enlarged into the determined size (for example, 800×480 pixels) at constant velocity. When the central position of the object area 210 is the same as the central position of the screen, the enlargement rate of the visual feedback 210 to 210d based on the vertices of the object area 210 may be the same.

In an example embodiment of the present invention, the video 200 to be imaged may be a video having 4 K resolution or more. When the object 202 from which the touch 203 is detected, is enlarged in the video having 4 K resolution, the resolution of the cropped object area 210 may be between 4 K resolution and HD resolution. For example, when, in the video having 4 K resolution, the size of the object area 210 of the object 202 from which the touch 203 is detected, is ¼ of the size of the screen, resolution of the object area 210 enlarged into the size of the screen may be FHD resolution. In terms of an angle of view, the object area 210 enlarged into the size of the screen may be the effect of twofold zooming based on the enlarged length.

According to another example embodiment of the present invention, the controller may provide visual feedback corresponding to enlargement of the object area 210. The controller may output auditory feedback (for example, an audio file, etc.) corresponding to enlargement of the object area 210 through the speaker 164.

The controller may provide at least one of visual feedback and auditory feedback corresponding to enlargement of the object area 210.

Figure 7A:
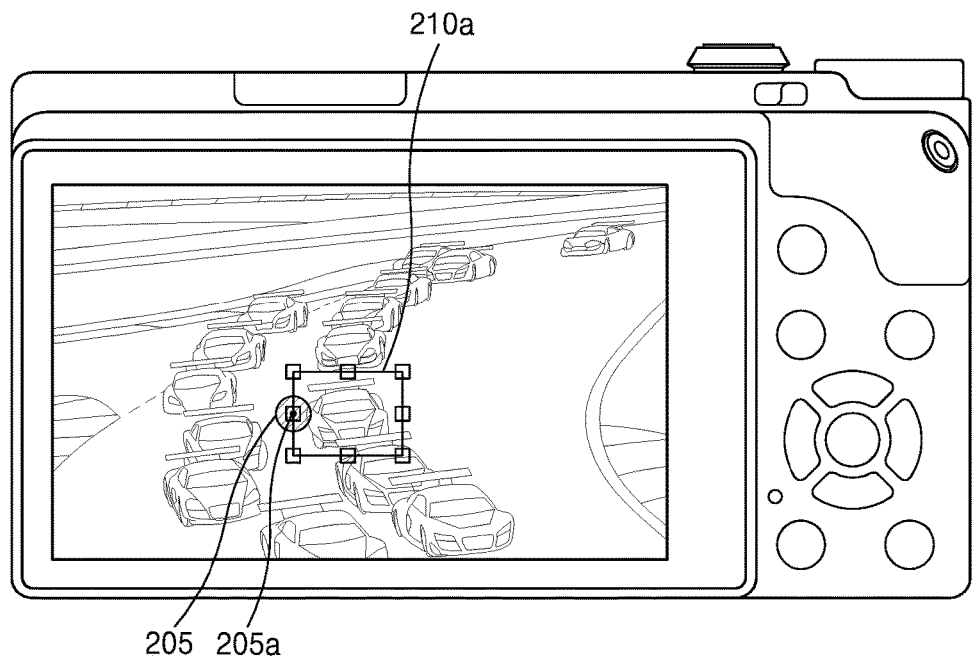
Figure 7B:
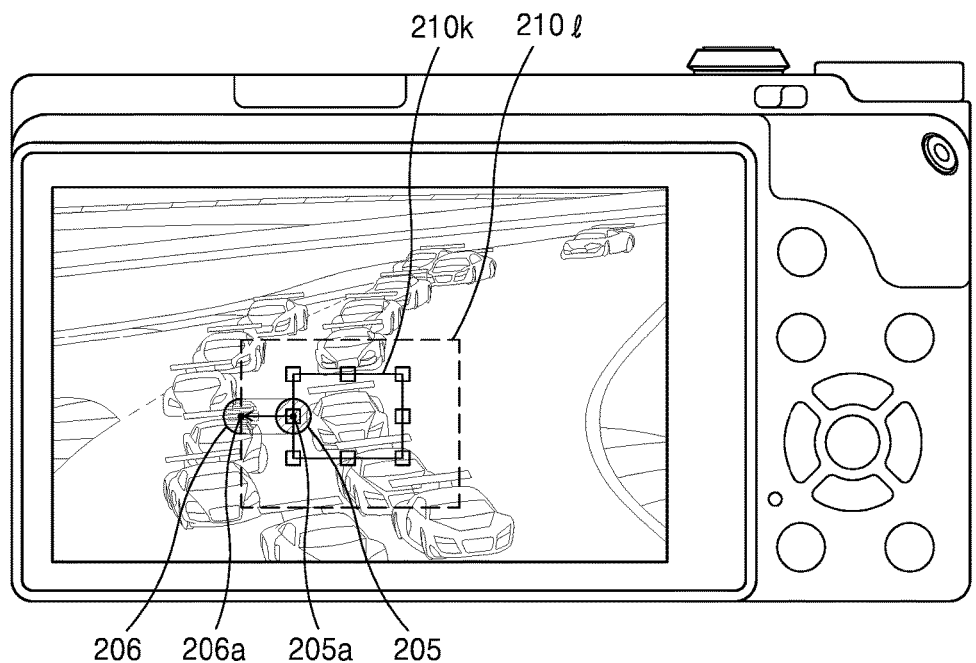

Referring to FIGS. 7A and 7B, the size of the object area 210 may be changed by the user input. The controller may detect a touch position 205a at the edge 210k using the touch screen 150 and the touch screen controller (not shown).

When the touch 205 is detected from the edge 210k of the object area 210, the controller displays a mark (for example, □) on the edge 210k of the object area 210. Also, when the touch 205 of the user is continuously in contact with the edge 210k of the object area 210, the controller may display the mark (for example, □) on the edge 210k of the object area 210. When the mark is displayed on the edge 210 of the object area 210, the size of the object area 210 may be changed by the user's input.

A continuous motion (for example, movement from the detection position 205a of the initial touch 205 to the detection position 20a of the final touch 206) of the touch 205 may be detected from the edge 210k of the object area 210 input by the user. The continuous motion of one touch 205 is separated from the touch screen 150 in the detection position 206a of the final touch 206. When the continuous motion of one touch is separated in the detection position 206a of the final touch 206, the controller may change the edge 210k of the object area 210 into the enlarged edge 210l. The controller may enlarge the enlarged edge 210l and display the enlarged edge 210*l* in the screen. Also, the controller may adjust imaging resolution based on the enlarged edge 210*l*. The controller may also save a video having adjusted imaging resolution.

In Operation S306 of FIG. 3A, object tracking and the enlarged object area are displayed.

Figure 4F:
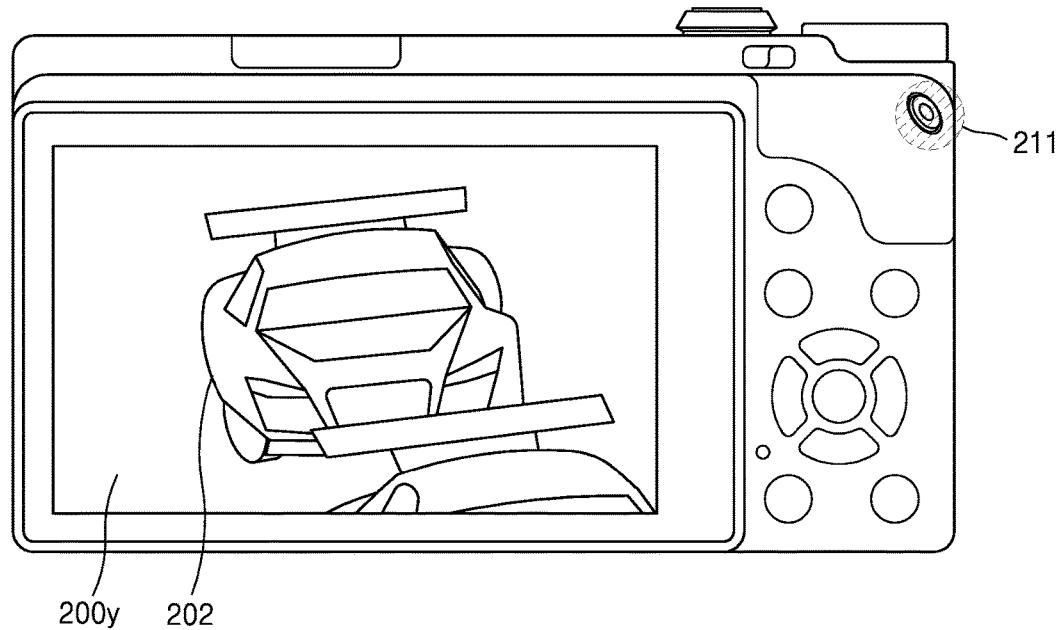

Referring to FIG. 4F, the object area 210 is enlarged and displayed on the screen by control of the controller (200*y*). The controller may track the object 202 of the enlarged object area 200*y*. The controller may continuously perform tracking of the object 202 of the enlarged object area 200*y* until the additional video imaging button 161*c* is selected. The controller may image and save the object 202 of the enlarged object area 200*y* until the additional video imaging button 161*c* is selected.

When the imaging device 100 is moved in response to the moved object 202, the controller may track the object 202 of the object area 200*y* and display the object 202 on the screen. Also, the controller may display the moved object 202 in a central area of the screen.

The controller may perform an auto focusing function and an auto exposure function on the object 202 of the enlarged object 200*y*. In the imaging device 100, an object to be auto-focused and auto-exposed in FIG. 4B and an object to be auto-focused and auto-exposed in FIG. 4F may be different from each other. The controller may adjust brightness and focus of the object 202 of the enlarged object 200*y*.

Also, the controller may apply various image processing (for example, a color interpolation function, a color correction function, a color space conversion function, a gamma correction function) in addition to the auto focusing function and the auto exposure function, to the object 202 included in the enlarged object 200*y*.

An object tracking method may include various algorithms, for example, point tracking, kernel tracking, and silhouette tracking. Point tracking, kernel tracking, and silhouette tracking are further subdivided and thus are diverse.

The object 202 enlarged and displayed in FIG. 4F is not displayed differently from other objects, differently from FIGS. 4D and 4E. For example, when the edge of the object 202 is displayed thick in FIGS. 4D and 4E, the edge of the object 202 in FIG. 4F may be displayed intactly, like in FIGS. 4B and 4CC.

In Operation S307 of FIG. 3A, the video is saved.

Referring to FIG. 4F, the video imaging button 161*c* of the imaging device 100 is pressed by a touch 211 of the user. The controller may save the video (for example, the video from FIG. 4B to FIG. 4F) from a time at which the first touch 201 is detected, to a time at which the third touch 211 is detected, in response to the pressed video imaging button 161*c* in the saving unit. Also, the controller may save the video (for example, the video from FIG. 4C to FIG. 4F) from a time at which the second touch 203 is detected, to the time at which the third touch 211 is detected, in response to the pressed video imaging button 161*c* in the saving unit.

Additional information (for example, a file name, a file size, a file generation time/date, an exposure time, an F-value, ISO sensitivity, a compression rate, a shutter speed value, a focal distance, a light measurement method, maximum brightness of a lens, flash, a description corresponding to the video, etc.) corresponding to the saved video 200 may be saved as meta data. Also, similar additional information to a saved still image may be saved as meta data. It will be easily understood by those skilled in the art that the additional information saved according to the imaging device 100 may be added, deleted or changed.

In Operation S307 of FIG. 3A, when the controller saves the video 200, the video generation method by the imaging device is terminated.

When going back to Operation S305 of FIG. 3A and the object from which the touch is detected, is enlarged and a PIP, Operation S308 is performed.

In Operation S308 of FIG. 3A, the object from which the touch is detected, is enlarged and displayed as a PIP.

Figure 4G:
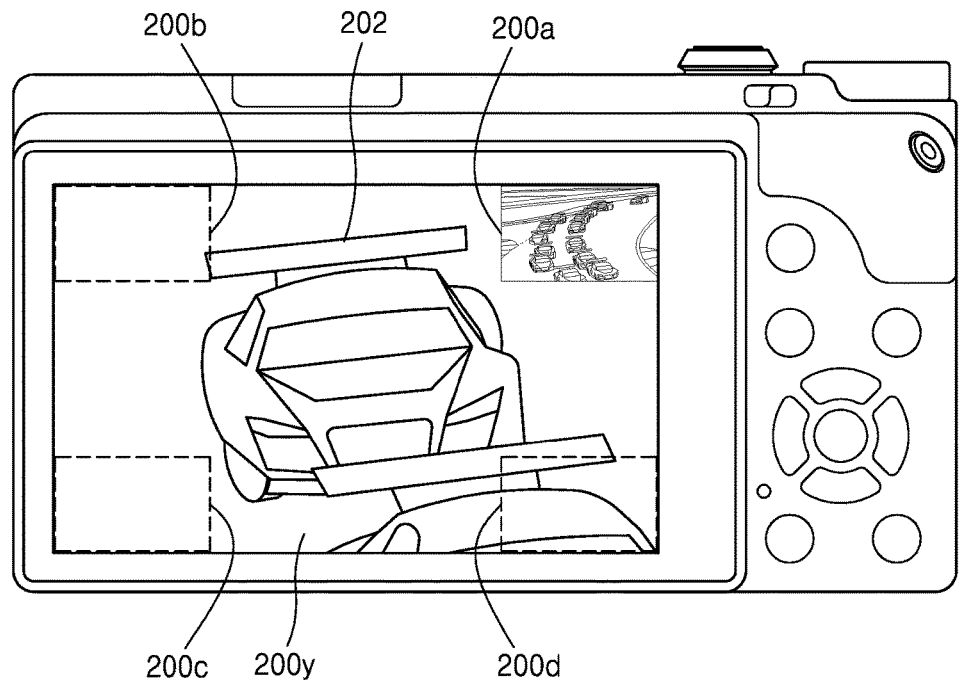

Referring to FIG. 4G, the object area including the object 202 from which the touch is detected, is enlarged and displayed by control of the controller (200*y*), and a reduced PIP screen 200*a* may be displayed in one of edges of the enlarged screen 200*y* of the object area 210.

The PIP screen 200*a* may be a screen displayed by scaling the video 200 to be imaged. The PIP screen 200*a* may be overlaid and displayed on the screen 200*y* in which the object area 210 is enlarged. Also, the controller may display the PIP screen 200*a* having transparency (for example, transparency of 0 to 100%).

The controller may track the object 202 of the enlarged object area 200*y*, which is distinguished from the PIP screen 200*a*. When the imaging device 100 is moved in response to movement of the object 202, the controller may track the object 202 of the object area 200*y* and display the tracked object 202 on the screen. Also, the controller may display the moved object 202 in the central area of the screen.

The controller may provide a current position of the enlarged screen 200*y* of the object area 210 in the video 200 and a position relationship between other objects to the user through the PIP screen 200*a*.

Also, the controller may change the position of the PIP screen 200*a* into other edges 200*b* to 200*d* by a touch (not shown) of the user or settings. For example, the controller may change the PIP screen 200*a* into other edges by a user input gesture (for example, touch and drag, not shown). The controller may move the PIP screen 200*a* to a position in which the user stops the touch gesture (for example, the central area of the screen, a space between two edges 200*a* and 200*b*) in addition to the edges.

It will be easily understood by those skilled in the art that the touch gesture for moving the PIP screen 200*a* may be various touch gestures (for example, flick, swipe, double tap, multi-touch gesture, etc.) as well as touch and drag.

In Operation S309 of FIG. 3A, enlargement of the object 302 and displaying of the PIP screen are substantially similar to enlargement of the object 302 in Operation S306 of FIG. 3A and thus, redundant descriptions thereof may be omitted.

In Operation S310 of FIG. 3A, the video is saved.

Figure 4H:
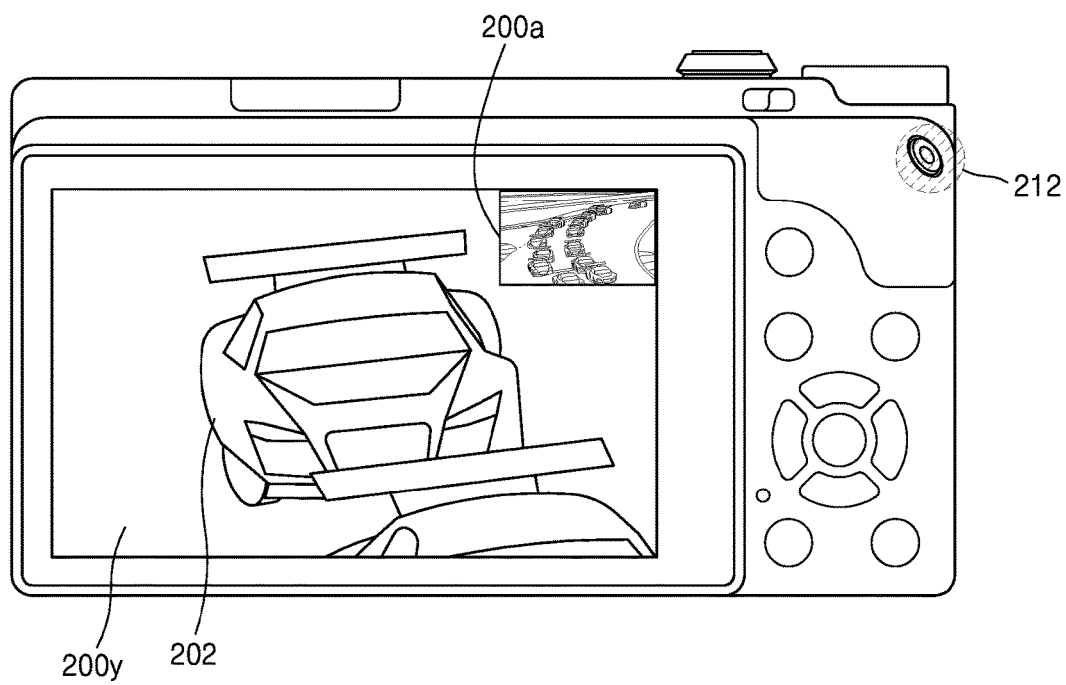

Referring to FIG. 4H, the video imaging button 161*c* of the imaging device 100 is pressed by a touch 212 of the user. The controller may save a video (for example, a video from FIG. 4B to FIG. 4G (excluding FIG. 4F)) from the time at which the first touch 201 is detected, to a time at which the fourth touch 212 is detected, in response to the pressed video imaging button 161*c* in the saving unit. Also, the controller may save the video (for example, a video from FIG. 4C to FIG. 4G (excluding FIG. 4F) from the time at which the second touch 203 is detected, to the time at which the fourth touch 212 is detected, in response to the pressed video imaging button 161*c* in the saving unit.

Additional information (for example, a file name, a generation date, a position of a PIP screen, the size of the PIP screen, a description corresponding to a video, etc.) corresponding to saved videos 200*y*+200*a* may be saved as meta data.

In Operation S310 of FIG. 3A, when the controller saves the videos 200y+200a, the video generation method by the imaging device is terminated.

Figure 3B:
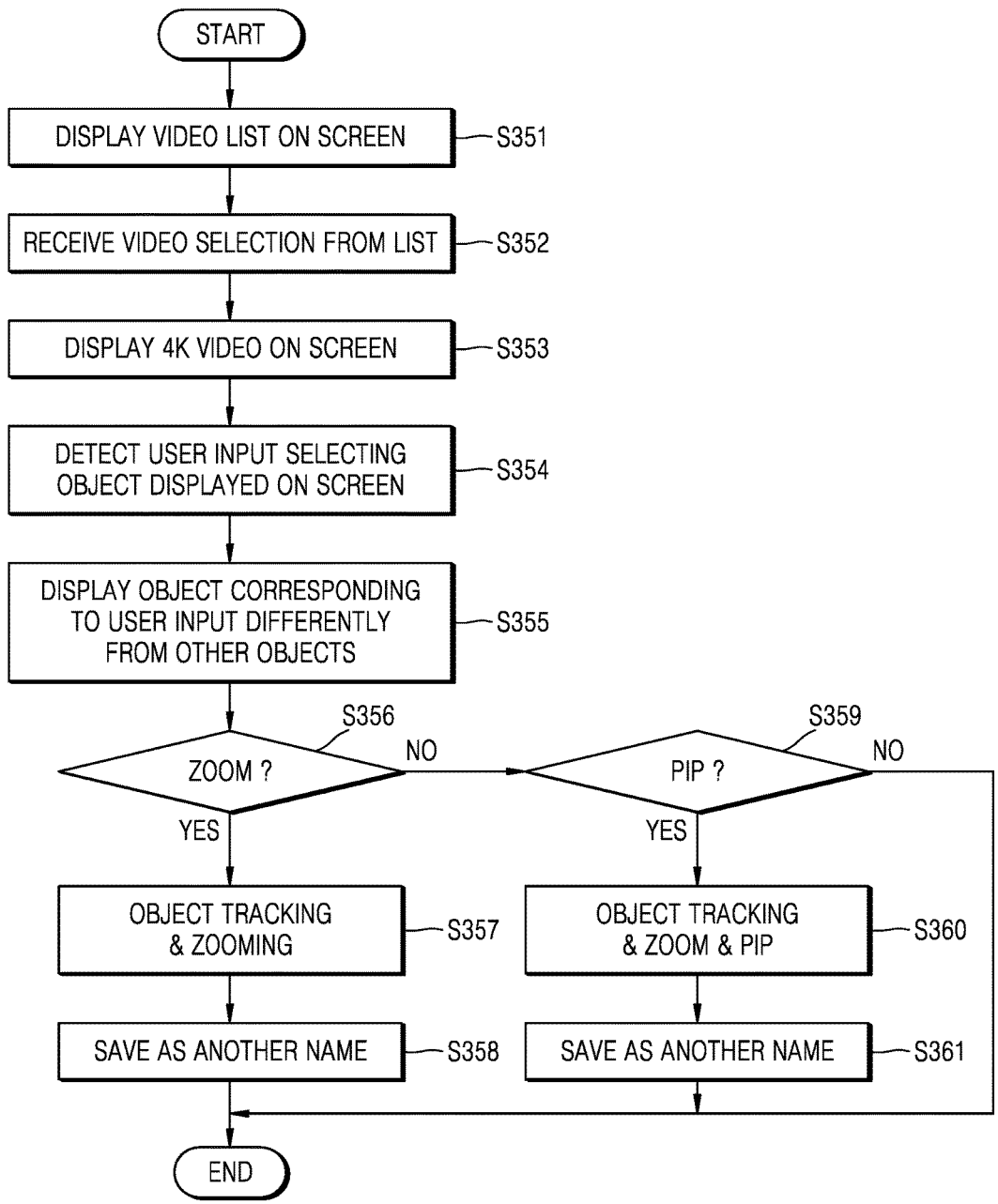
FIG. 3B is a schematic flowchart illustrating a video generation method by an imaging device according to another example embodiment of the present invention.

FIG. 3B is a schematic flowchart illustrating a video generation method by an imaging device according to another example embodiment of the present invention.

In Operation S351 of FIG. 3B, the video list is displayed on the screen.

Figure 8A:
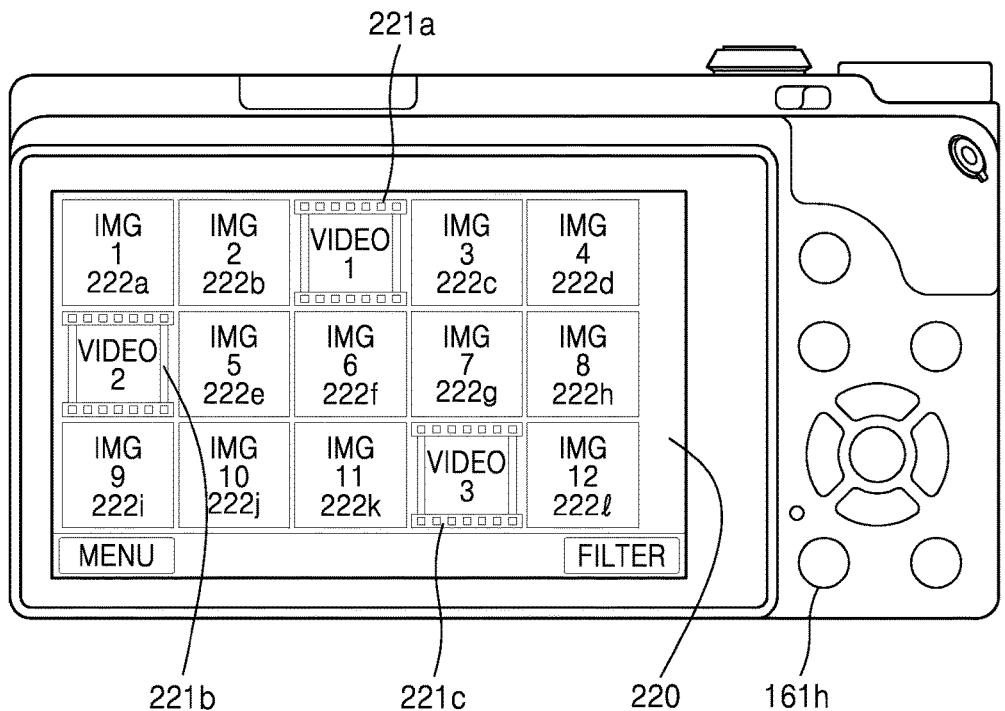

Referring to FIG. 8G, the controller displays the video list 220 aligned in the size of a thumbnail on the screen corresponding to the user's input (not shown). For example, the user's input is detected from the playback button 161h, the controller may display the video list 220 on the screen. The displayed video list 220 may include still images 222a to 222l in addition to the videos 221a to 221c.

The still images 222a to 222l or the videos 221a to 221c displayed in the video list 220 have been already saved in the saving unit 170. Also, the still images 222a to 222l or the videos 221a to 221c displayed in the video list 220 may be downloaded from the external device through the communication unit 120 by control of the controller.

In Operation S352 of FIG. 3B, video selection is received from the video list.

Figure 8B:
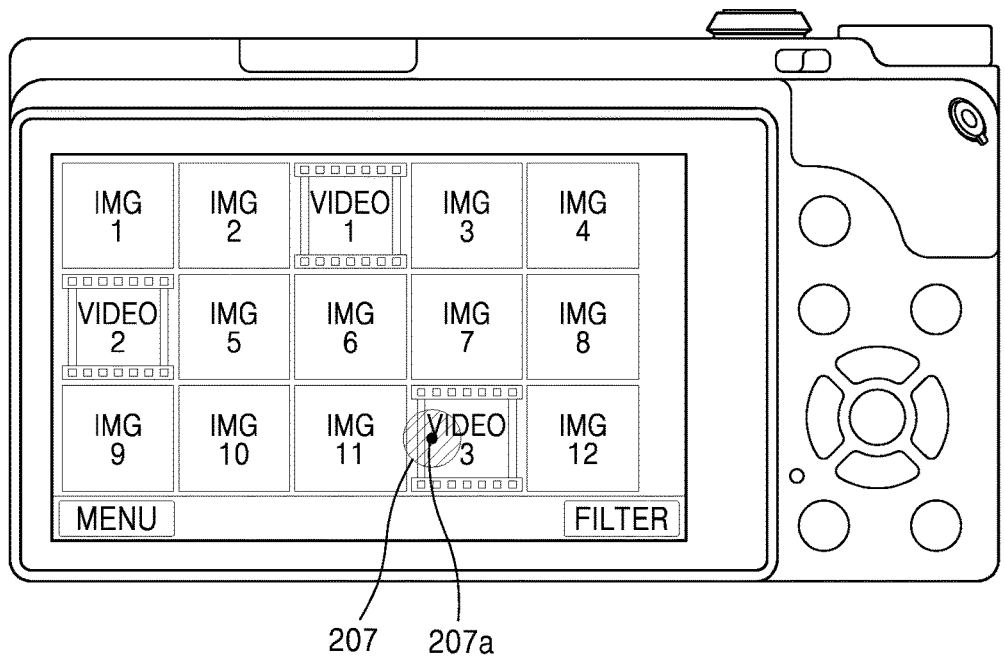

Referring to FIG. 8B, the video 221c is touched by the user from the video list 220. The controller detects a $21^{th}$ touch 207 from the screen through the touch screen 150 and the touch screen controller (not shown). The controller receives $21^{th}$ position information (for example, X21- and Y21-coordiantes corresponding to 207a) corresponding to the $21^{th}$ touch 203 from the touch screen controller (not shown). Also, the user's hovering may be detected from the video 221c.

Detection of the touch 207 in Operation S352 of FIG. 3B is substantially the same as Operation S303 of FIG. 3A and thus, redundant descriptions thereof may be omitted.

The video generation method in Operations S353 to S361 of FIG. 3B is substantially the same as the video generation method in Operations S302 to S310 of FIG. 3A and thus, redundant descriptions thereof may be omitted.

Methods according to example embodiments of the present invention may be implemented in the form of program instructions that may be executed by various computer units and may be recorded in a computer-readable medium. The computer-readable medium may include program instructions, data files, and a data structure solely or a combination thereof. For example, the computer-readable medium may be stored in a storage medium that may be optically or magnetically recorded and simultaneously read by a machine (for example, a computer), for example, a volatile or non-volatile storage device such as read only memory (ROM), or memory such as read access memory (RAM), a memory chip, a device or an integrated circuit (IC), or a compact disk (CD), a digital versatile disk (DVD), a magnetic disk or a magnetic tape, regardless whether deletion or re-imaging is possible.

It will be understood that memory that may be included in a portable device is an example of a storage medium that may be read by a machine suitable for storing a program or programs including instructions for implementing example embodiments of the present invention. Program instructions recorded on the medium may be specially designed and configured for the present invention or may be publicly known and available to those skilled in the art of computer software.

While the invention has been shown and described with reference to certain example embodiments thereof, it will be understood by those skilled in the art that various changes in form and details may be made therein without departing from the spirit and scope of the invention as defined by the appended claims.

The invention claimed is:

1. A method for generating video by an imaging device, the method comprising:
    displaying video on a screen of the imaging device;
    detecting a user input for selecting an object in the video;
    enlarging a first area and displaying the enlarged first area on the screen; and
    performing an auto exposure function and an auto focusing function corresponding to the object included in the enlarged first area,
    wherein the first area includes the object and is cropped from the video, and a size of the enlarged first area corresponds to a size of the screen.

2. The method of claim 1, wherein the size of the enlarged first area is changeable.

3. The method of claim 1, wherein the video displayed on the screen is displayed based on one of pressing a video imaging button of the imaging device and selecting the video from a video list displayed on the screen.

4. The method of claim 1, further comprising tracking the detected object in the enlarged first area and displaying the tracked object.

5. The method of claim 4, further comprising storing the enlarged first area including the tracked object.

6. The method of claim 4, further comprising displaying a picture-in-picture (PIP) screen overlaying a portion of the enlarged first area, wherein the PIP screen is acquired by scaling the video.

7. The method of claim 6, wherein the PIP screen is movable within the screen.

8. The method of claim 1, wherein the enlarging of the first area and displaying of the enlarged first area comprises:
    providing at least one of visual feedback and auditory feedback corresponding to enlargement of the first area; and
    displaying the object differently from other objects included in the video.

9. The method of claim 1, wherein resolution of the enlarged first area is lower than resolution of the video.

10. An imaging device comprising:
    a touch screen configured to display video; and
    a controller configured to control the touch screen,
    wherein the controller is configured to detect a user input for selecting an object in a video displayed on the touch screen, display the object differently from other objects in the video based on the touch input, enlarge a first area included in the video, and display the enlarged first area on the screen,
    wherein the first area includes the object and a size of the enlarged first area corresponds to a size of the screen, and
    wherein the controller is configured to control auto focusing and auto exposure functions corresponding to the object included in the enlarged first area.

11. The imaging device of claim 10, further comprising a video imaging button,
    wherein the controller is configured to display the video on the touch screen based on detecting pressing of the video imaging button.

12. The imaging device of claim 10, wherein the video imaging button further comprises a switch for selecting a video mode, and an outer diameter of the video imaging button is smaller than an outer diameter of the switch.

13. The imaging device of claim 10, further comprising a speaker, wherein the controller is configured to control at least one of visual feedback corresponding to enlargement of the first area through the touch screen and auditory feedback corresponding to the enlargement of the first area through the speaker.

14. An imaging device comprising:
a touch screen configured to display video; and
a controller configured to control the touch screen,
wherein the controller is configured to detect input for selecting an object in a video displayed on the touch screen, display the object differently from other objects in the video based on the input, enlarge a first area included in the video, and display the enlarged first area on the screen,
wherein the first area includes the object and a size of the enlarged first area corresponds to a size of the screen, and
wherein the controller is configured to track the selected object in the enlarged first area, display the tracked object, and control auto focusing and auto exposure functions corresponding to the object included in the enlarged first area.

\* \* \* \* \*